J. DRUMB.
AUTOMOBILE BUMPER.
APPLICATION FILED SEPT. 15, 1920.
1,377,816.
Patented May 10, 1921.
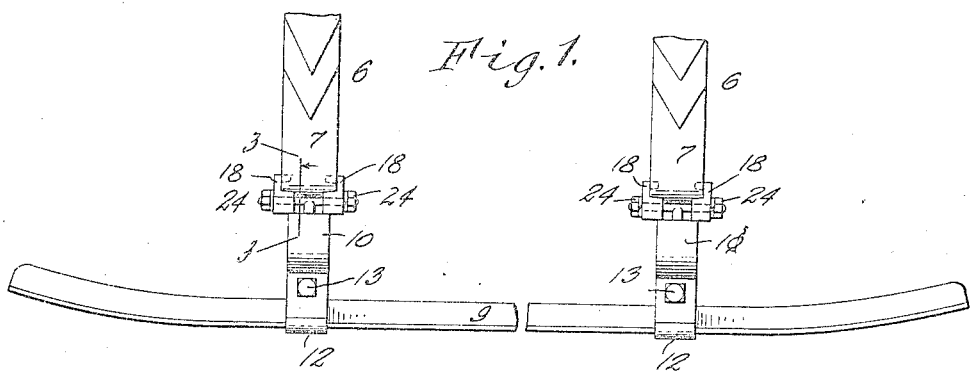
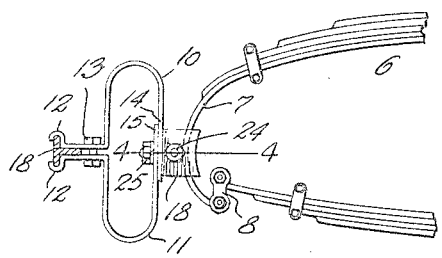
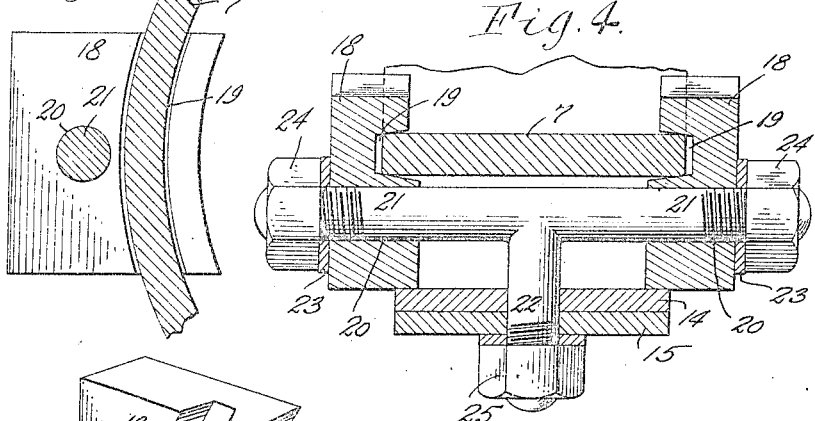
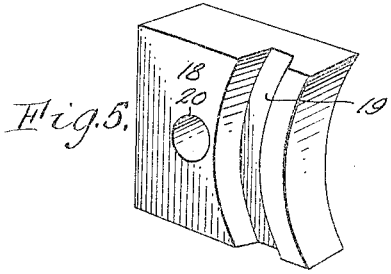

UNITED STATES PATENT OFFICE.

JOHN DRUMB, OF BUFFALO, NEW YORK, ASSIGNOR TO McKINNON DASH COMPANY, OF BUFFALO, NEW YORK.

AUTOMOBILE-BUMPER.

1,377,816.   Specification of Letters Patent.   Patented May 10, 1921.

Application filed September 18, 1920.   Serial No. 411,197.

*To all whom it may concern:*

Be it known that I, JOHN DRUMB, a citizen of the United States, residing at Buffalo, in the county of Erie and State of New York, have invented a new and useful Improvement in Automobile - Bumpers, of which the following is a specification.

This invention relates to bumpers for automobiles and more particularly to bumpers adapted to be attached to the rear of a vehicle, and for means for attaching the bumpers to a vehicle.

The objects of the present invention are to provide a bumper which is readily attachable to and detachable from the rear springs of a vehicle; also to provide an improved bumper which consists of relatively few parts and is of simple construction and relatively inexpensive of manufacture. Further objects are to provide improved bumper attaching means adapted to fit different sizes of springs and which shall be readily adjustable to support the bumper at different elevations; also to improve vehicle bumper structures in the other respects hereinafter described and set forth in the claims.

In the accompanying drawings:

Figure 1 is a fragmentary plan view of the rear springs of a vehicle and an attached bumper constructed according to the invention.

Fig. 2 is a sectional elevation thereof.

Fig. 3 is an enlarged sectional elevation thereof on line 3—3, Fig. 1.

Fig. 4 is an enlarged horizontal section thereof, on line 4—4, Fig. 2.

Fig. 5 is an enlarged perspective of one of the clamping members thereof.

The bumper is shown in the accompanying drawing as applied to the usual three-quarter elliptic springs 6, including upper and lower springs. A leaf 7 of the upper spring projects outwardly constituting a curved, outer end of the spring structure and is connected by a shackle 8 to a leaf of the lower spring.

The bumper includes a bumper bar 9 which may be of any desired form, that shown being substantially of T-shaped cross section and substantially rigid. The bar is supported from the vehicle in the construction shown by means of two sets of supporting spring members, each set comprising oppositely looped members 10 and 11. These members are attached at one end to the bumper bar, the members being for this purpose provided with ends 12 formed to grip the bar and held in engagement with the bar by means of bolts 13 or the like. The other ends 14 and 15 of the spring members preferably overlap and are secured to the vehicle. The spring members 10 and 11 cushion any blows to which the bumper bar 9 may be subjected.

The attaching means include a pair of brackets which clamp onto the outer, curved end of the spring leaves 7 and securely hold the bumper supporting parts in position thereon. As shown, each bracket preferably comprises a pair of oppositely disposed clamping parts 18, each formed with an arcuate slot 19 in its inner face and each part has a hole 20 extending transversely therethrough. The slots 19 receive the edges of the spring leaf 7 and preferably taper inwardly, the width of the slots at the inner faces of the members 18 preferably being greater than the thickness of the lower leaves of the springs commonly in use. By such provision, the clamping members are adapted for use on springs of various thickness as the edges of the springs of relatively thin metal will rest at the bottom of the slots while the edges of springs of thicker metal may enter the slots and be firmly held therein at some intermediate part by the tapering or converging walls of the slots. Furthermore, by reason of the excess width of the outer portion of the slot, it is obvious that the clamp may be readily used on spring portions of greater or less curvature.

The parts 18 are firmly held on the spring member 7 by a bolt or other suitable means. It is preferred to use for this purpose a T bolt having three threaded shanks comprising a pair of alined shanks 21 and a third shank 22 projecting substantially at a right angle to the pair. The shanks 21 extend through the holes in the clamping members and are provided with usual washers 23 and nuts 24, whereby the clamping parts 18 may be firmly held on the spring. The shanks 21 of the bolt are preferably of such length and threaded for a sufficient distance to permit of adjustment of the clamping members to springs of various widths.

The angularly projecting shank 22 of the bolt extends outwardly beyond the ends of the clamping members 18 and passes through holes in the ends 14 and 15 of the supporting members and is equipped with a washer and nut 25, whereby the ends 14 and 15 are held against movement relatively to one another and are securely clamped to the bracket. In the construction shown, the outer face of the support end 14 rests flatly against the end-faces of the clamping members 18 and is pressed tightly against these members when the nut 25 is tightened, thereby bracing the clamping parts 18 and preventing any play relative to the bolt. While the construction of the spring supporting member described is preferred, it is contemplated that other forms of bumpers and spring supporting means may be used with the bracket structure of this invention.

To attach the bumper, it is not necessary to make any changes in the spring structure; the clamping member will readily fit springs of various thicknesses. The bumper may be readily attached without the use of special tools and the elevation of the bumper may be readily adjusted by moving the bracket portion on the spring member, which may be done by loosening one or both of the nuts 24, whereupon the bracket may be moved or slid on the leaf 7 to the desired location and the nuts tightened. The bumper can be easily attached to a vehicle by first attaching the brackets to the springs, then securing the spring supporting members on the brackets and finally securing the bumper bar on the spring supporting members, so that one may easily attach the bumper to a vehicle.

I claim as my invention:—

1. A vehicle bumper including a bumper bar, a set of supporting spring members for said bumper having oppositely disposed loop portions and provided with ends adapted to grip said bumper bar and overlapping ends adapted to be secured to a vehicle.

2. In an automobile bumper, the combination of a bumper bar, spring supporting means for said bar including a pair of spring members having oppositely disposed and vertically-extending looped portions, one end of each spring member having a gripping engagement with said bar and the other ends of said members overlapping, and means for securing said overlapping ends to a spring of an automobile.

3. In a vehicle bumper, the combination of spring bumper-supporting means comprising oppositely bent spring strips having overlapping free ends, and a bracket for securing said supporting means to the vehicle, said bracket having a part for securing said free ends of the strips together and to the bracket, and parts for clamping to said vehicle.

4. In a vehicle bumper, the combination of a bumper bar, and a pair of spring supporting members therefor, each comprising a pair of U-shape springs attached at one end to said bumper bar, the free ends of said springs overlapping, and means for attaching said spring supporting members to the body springs of a vehicle, said means including a part for releasably holding said overlapping ends of said supporting means together and to said attaching means.

5. In combination with a vehicle body leaf spring and a bumper and supporting means therefor, a pair of clamping members formed with slots to receive the edges of a spring leaf, and means for securing said clamping members on said leaf edges and securing said bumper support to said clamping members.

6. In combination with a vehicle body spring of the elliptical type, a bumper, a clamping member provided with an arcuate slot for receiving the edge of a spring leaf, and means for securing said clamping member to said spring leaf.

7. In combination with a vehicle body spring of the elliptical type, a bumper, a clamping member provided with an inwardly tapering slot for receiving the edge of a spring leaf, and means for securing said clamping member to said spring leaf.

8. In combination with a vehicle body spring of the elliptical type, a bumper, a clamping member provided with a slot for receiving the edge of a spring leaf, said slot tapering inwardly from the face of said clamping member and the width of said slot at the face of the member being greater than the thickness of said spring leaf.

9. In combination with a vehicle body spring of the elliptical type, a bumper, a clamping member having a slot in its inner face for receiving the edge of a spring leaf, said slot presenting an opening of greater width than the thickness of said spring leaf.

10. In combination with a vehicle body leaf spring, a bumper and bumper supporting means, a pair of clamping members each having a slot to receive the edge of a leaf of said spring, said clamping members having bolt-receiving holes therethrough, and a bolt having shanks extending through the holes in said clamping members and a shank extending angularly from said first named shanks and projecting beyond the ends of said clamping members, and means for connecting said bumper supporting means to said last named shank.

11. In combination with a vehicle body spring of the elliptical type and a bumper, spring supporting means for said bumper including spring strips having overlapping ends, a pair of clamping members formed with slots for receiving the edges of a leaf of said body spring, said clamping members having flat outer ends constituting seats for the overlapping spring strip ends, and means for securing said clamping members to said spring leaf and said strip ends to said clamping members.

12. In combination with a vehicle body spring of the elliptical type and a bumper, spring supporting means for said bumper including spring strips having overlapping ends, a pair of clamping members formed with slots for receiving the edges of a leaf of said body spring, and a bolt for securing said clamping members to said spring leaf and said spring strip ends to said clamping member.

Witness my hand this 17th day of September, 1920.

JOHN DRUMB.

Witness:
W. D. NORMAN.